US008867901B2

(12) United States Patent
Gebert et al.

(10) Patent No.: US 8,867,901 B2
(45) Date of Patent: Oct. 21, 2014

(54) MASS PARTICIPATION MOVIES

(75) Inventors: Robert R. Gebert, Burbank, CA (US); Tracy L. Evans, Sugar Land, TX (US)

(73) Assignee: Theatrics. com LLC, Stafford, TX (US)

( * ) Notice: Subject to any disclaimer, the term of this patent is extended or adjusted under 35 U.S.C. 154(b) by 715 days.

(21) Appl. No.: 12/701,360

(22) Filed: Feb. 5, 2010

(65) Prior Publication Data

US 2011/0194839 A1 Aug. 11, 2011

(51) Int. Cl.
*H04N 9/80* (2006.01)
*H04N 5/93* (2006.01)
*G11B 27/034* (2006.01)
*H04N 5/445* (2011.01)
*H04N 21/2668* (2011.01)
*H04N 21/475* (2011.01)
*H04N 21/4788* (2011.01)
*H04N 21/482* (2011.01)
*H04N 21/845* (2011.01)

(52) U.S. Cl.
CPC ............ *G11B 27/347* (2013.01); *G11B 27/034* (2013.01); *H04N 5/44543* (2013.01); *H04N 21/2668* (2013.01); *H04N 21/4756* (2013.01); *H04N 21/4788* (2013.01); *H04N 21/4826* (2013.01); *H04N 21/8456* (2013.01)
USPC .......................................... 386/278; 386/248

(58) Field of Classification Search
CPC ..... H04N 9/8042; H04N 5/85; G11B 27/034; G11B 2220/90; G11B 27/34; G11B 27/105; G11B 27/024; G11B 27/032; G11B 27/031; G11B 2220/20; G11B 27/036; G11B 5/0086; G11B 15/1875

USPC .......................................... 386/278–290, 248
See application file for complete search history.

(56) References Cited

U.S. PATENT DOCUMENTS

| 5,692,212 | A | 11/1997 | Roach |
| 6,353,461 | B1* | 3/2002 | Shore et al. ................. 348/722 |
| 6,414,725 | B1* | 7/2002 | Clarin et al. ................. 348/714 |
| 6,912,726 | B1 | 6/2005 | Chen |
| 7,371,068 | B2* | 5/2008 | Lloyd et al. ................. 434/262 |
| 2003/0060910 | A1 | 3/2003 | Williams et al. |
| 2003/0079218 | A1 | 4/2003 | Goldberg et al. |
| 2003/0234812 | A1 | 12/2003 | Drucker et al. |
| 2005/0028193 | A1 | 2/2005 | Candelore |
| 2007/0015464 | A1 | 1/2007 | Disalvo |
| 2007/0077039 | A1* | 4/2007 | Eklund et al. ................. 386/125 |
| 2007/0157164 | A1 | 7/2007 | Fannin |
| 2007/0162854 | A1 | 7/2007 | Kikinis |
| 2007/0282614 | A1 | 12/2007 | Dreke |

(Continued)

FOREIGN PATENT DOCUMENTS

JP   2005044258 A   2/2005
WO   2007/073010 A1   6/2007

OTHER PUBLICATIONS

PCT International Search Report, PCT/GB2010/001311, issued Feb. 24, 2011.

*Primary Examiner* — Nigar Chowdhury
(74) *Attorney, Agent, or Firm* — Peter V. Schroeder

(57) ABSTRACT

A system, method, and computer program product are provided for mass participation movies. A storyline is provided to story line subscribers. Video segments based on the storyline are received from the story line subscribers. Viewers are enabled to view at least one of the video segments as part of a mass participation movie via user interfaces associated with the viewers.

14 Claims, 4 Drawing Sheets

(56) References Cited

U.S. PATENT DOCUMENTS

| | | | |
|---|---|---|---|
| 2008/0010601 A1* | 1/2008 | Dachs | 715/751 |
| 2008/0092047 A1* | 4/2008 | Fealkoff et al. | 715/716 |
| 2008/0288890 A1* | 11/2008 | Anderson et al. | 715/810 |
| 2008/0294694 A1 | 11/2008 | Maghfourian | |
| 2009/0046097 A1 | 2/2009 | Franklin | |
| 2009/0129740 A1* | 5/2009 | O'brien et al. | 386/52 |
| 2009/0186700 A1 | 7/2009 | Konkle | |
| 2009/0226046 A1* | 9/2009 | Shteyn | 382/118 |
| 2009/0238538 A1* | 9/2009 | Fink | 386/83 |
| 2009/0271279 A1 | 10/2009 | Brandelli | |
| 2010/0260468 A1* | 10/2010 | Khatib et al. | 386/52 |
| 2010/0333142 A1* | 12/2010 | Busse et al. | 725/47 |
| 2012/0155829 A1* | 6/2012 | Momosaki | 386/230 |
| 2014/0109141 A1* | 4/2014 | Gossweiler et al. | 725/44 |

* cited by examiner

MASS PARTICIPATION MOVIES

CROSS REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

FIELD OF THE PRESENT DISCLOSURE

This invention relates generally to motion pictures, television, or videos, and more specifically to a system, method, and computer program product for creating mass participation movies and enabling the viewing of portions of mass participation movies.

BACKGROUND

Traditionally, digital and analog media consumers accessed audio and/or video media to decide which recorded audio and/or video media to purchase, to view, to listen to, to go and see at the local movie theater, or to purchase or rent from a video or audio rental store for home viewing or listening. In the past, these standard brick and mortar establishments provided the majority of recorded digital and analog media to consumers.

Recently, video and audio files have become more available over the Internet, such that the end user does not need to go to a local audio or video rental store that may or may not have the desired media selection. More powerful computers and ready Internet access (also know as the World Wide Web) have increased the popularity of digital multimedia transmission over the Internet and receipt or use by computers attached to the Internet. Servers attached to the Internet can act as a large repository of audio files, games, and movie files which can be down-loaded for storing listening, and/or viewing. For example, web pages that are available at servers hosting web sites on the Internet often include digital media files that can be down-loaded by visitors through the web site or accessed by those visitors via streaming media.

SUMMARY

Media consumers include many professional, academic, and community theater actors who are constantly looking for an acting project in which to be involved and a stage upon which to perform. Many of these actors annually invest hundreds, even thousands, of dollars on training, opportunities, and promotions. These actors may greatly desire a worldwide forum to develop their skills, promote themselves, and share their talents with viewers. Many friends of these actors would be willing to regularly support these actors by viewing videos of these actors from such a forum. A properly designed and executed forum would even attract viewers from among people who regularly watch television and film and do not know these actors.

A system, method, and computer program product are provided for mass participation movies. Mass participation movies are episodic web-based video programs which may feature thousands of actors and may be viewed through the Internet. A varying storyline, which may include various scenarios within the context of a continuing story, is occasionally provided, possibly through a website, to actors who are story line subscribers. In order to develop and portray a unique character in the continuing story, each of the story line subscribers decide how a scenario impacts their character's situation and accordingly writes or improvises a scene for their character. The story line subscribers create video segments of the written or improvised scenes for their characters. The story line subscribers send in their video segments, possibly by uploading their video segments to a website. Viewers can access a website to view the video segments that are part of a mass participation movie. The viewers may also receive recommendations to view other video segments based on popularity of video segments and a viewer's viewing history, such as the viewer's choices and favorite actors. A new viewer may watch a compilation of video segments of previous scenarios to bring the new viewer up to date with the current scenarios. A mass-participation movie can engage thousands of actors and viewers in an enjoyable experience that they would want to repeat and to share with their friends.

BRIEF DESCRIPTION OF THE DRAWINGS

Drawings of the preferred embodiments of the present disclosure are attached hereto so that the embodiments of the present disclosure may be better and more fully understood.

DETAILED DESCRIPTION OF SOME EMBODIMENTS

Figure 1:
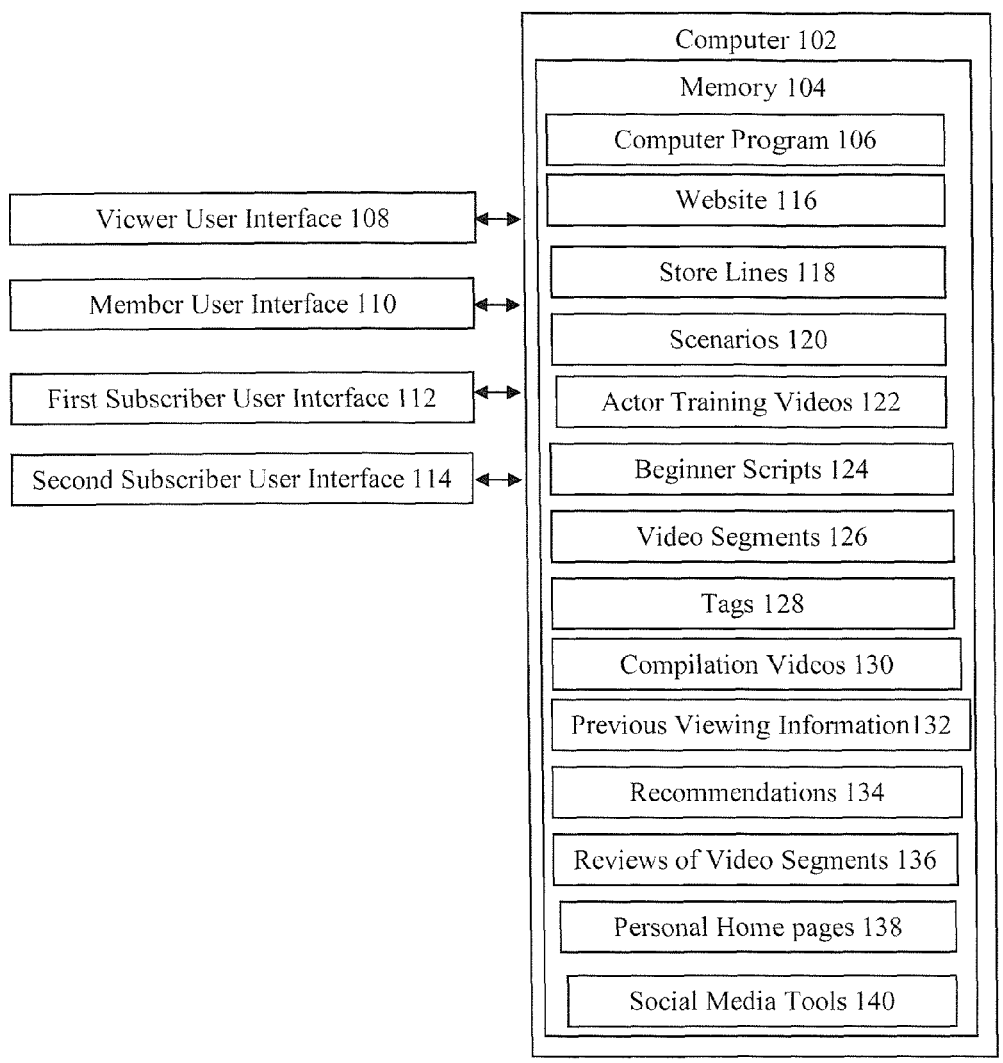
FIG. 1 presents a sample system of the present disclosure.

FIG. 1 presents a sample system 100 of the present disclosure. The system 100 includes a computer 102, a memory 104, a computer program 106, a viewer user interface 108, a member user interface 110, a first subscriber user interface 112, and a second subscriber user interface 114. The computer program 106 is stored in the memory 104 and executed by the computer 102 to communicate via the user interfaces 108-114. Although FIG. 1 depicts that the memory 104 may also include a website 116, story lines 118, scenarios 120, actor training videos 122, beginner scripts 124, video segments 126, tags 128, compilation videos 130, previous viewing information 132, recommendations 134, reviews of video segments 136, personal home pages 138, and social media tools 140, the elements 116-140 may reside in a separate data storage (not depicted in FIG. 1) or any combination of the elements 116-140 may reside in any combination of the memory 104 and the separate data storage. Although FIG. 1 depicts one of each of the elements 102-140, the system 100 may include any number of each of the elements 102-140, as well as additional elements that are not depicted in FIG. 1.

Although examples describe the communication for mass participation movies as occurring via the Internet, some embodiments of the present disclosure may use another means of communication. The user interfaces 108-114 provide access for viewers, which may include both registered members and subscribers, to create and view the video segments 126 of the mass participation movie. Access may be based on acceptance of access-enabling information, such as user identifications and passwords, input via the user interfaces 108-114.

Varying story lines 118, which may include various scenarios 120 within the context of a continuing story, are occasionally provided to actors who are story line subscribers, possibly from the website 116 to the subscriber user interfaces 112-114. For example, the main story line revolves around life in the city of Springfield, a system administrator creates a scenario about strange lights in the skies of Springfield, and the computer program 106 enables the website 116 to provide this scenario to actors Sally and Biff via the subscriber user interfaces 112 and 114. The storyline and/or the scenarios 120 may be provided via the website 116, email communications, a web log, a web video, an on-line forum, and/or tangible objects conveyed by couriers, such as standard mail. Additionally, some of the story line subscribers may be enabled to suggest a specific story line and or the scenarios 120 that may be subsequently provided to all of the story line subscribers based on a collaborative process, a voting process, and/or an approval by a system administrator. For example, Biff and Sally may use the subscriber user interfaces 112 and 114 to submit idea fragments, script examples outlines, videos, and/or video blogs to a story line forum. In this example, next week's story line may created by the system administrators nominating their favorite ideas from among each submitted scenario and subscribers' subsequent voting for each nominated scenario.

An artist may create a newsletter that colorfully describes the story line and its scenarios 120. For example, an artist creates a newsletter that describes the main scenarios 120, the mysterious lights appearing in the Springfield sky and a hint about an upcoming series of minor earthquakes, in terms that inspire character response for actors. In this example, the computer program 106 emails the artist's newsletter to Sally and Biff via the subscriber user interfaces 112 and 114. The storyline and scenarios may also be conveyed through a web video. Furthermore, subscribers may have to play a game, solve a puzzle, or conduct a scavenger hunt to determine secret details for a scenario, such as the identity of a Springfield resident who vanished when the strange lights were first noticed.

The scenarios 120 may be independent of, yet intersect with elements of the main story line. For example, if an additional scenario identifies a haunting in the Springfield library, a character may express a belief that the ghost in the library looks like a Springfield resident mentioned in a previous scenario. Each of the scenarios 120 may build to major climaxes and resolutions, but the main story line may continue indefinitely without any resolution. For example, while the scenario involving a ghost in the library may build to a conclusion when the remains of a murdered librarian are found and her killer is brought to justice, life in Springfield will still continue based on other scenarios 120. The actor training videos 122, actor forums, the beginner scripts 124, and/or hints for subsequent story lines and/or scenarios 120 may be provided to the story line subscribers. For example, amateur actor Sally accesses one of the actor training videos 122 available though the website 116 via the first subscriber user interface 112 to improve her acting skills sufficiently to have enough confidence to create her video segments 126, while professional actor Biff accesses an actor forum available though the website 116 via the second subscriber user interface 112 to consult with other professional actors about Biff's ideas for his video segments 126. In another example, Sally may review a beginner fill-in-the blanks script for a librarian from the beginner scripts 124 before she feels comfortable enough to create her first video segment.

Actors create the video segments 126 for their characters, modifying their character's actions based on how the actor perceives their character would respond to the changes, outsiders, multiple plots, varied personalities, and influences described in the various scenarios 120 of the story line. Unlike a script for a television program or a film that specifies every action taken and every word uttered by an actor, the scenarios 120 provide a broad outline that guides the actors in creating compelling improvisations. Additionally, the actors may create their own scenarios within the context of the story line. The system administrators may periodically monitor the actors' interest and/or the viewers' interest in various scenarios 120 presented to determine which aspects of a story line deserves the most attention in subsequent scenarios 120 or when a popular element of a scenario may be enhanced. For example, if a disproportionately large number of actors create video segments 126 about the haunting in the library and a disproportionately large number of viewers select to view video segments 126 about the haunting in the library, the system administrators may feature this scenario more prominently in next week's scenarios 120 and may be more likely to create similar scenarios 120 in the future.

In order to develop and portray a unique character in the continuing story, the story line subscribers decide how a scenario impacts their character's situation and accordingly write or improvise a scene for their character, possibly through the use of tools provided by the website 116, such as actor training videos 122 and actor forums. The story line subscribers create a video segment of the written or improvised scene for their character. For example, Sally creates a video segment in which she vividly describes her strange experiences as a new librarian in the Springfield library, while Biff creates a video segment in which his character is a skeptical cab driver who dismisses reports from his customers about strange lights in the skies.

Sally and Biff may also collaborate with each other when creating their video segments 126. For example, Sally and Biff use subscriber user interfaces 112 and 114 to communicate about their characters, and Sally's librarian mentions Biff's skeptical cab driver in Sally's video segment. In another example, Sally and Biff send portions of their own video segments 126 to each other, and include portions of each other's video segments 126 to create their own video segments 126. In yet another example, Sally and Biff use subscriber user interfaces 112 and 114 to create collaborative video segments via a live web conference. In a further example, Sally and Biff use subscriber user interfaces 112 and 114 to arrange a convenient time and place to meet to record their characters together in a video segment. In addition to using portions of another subscriber's video segments 126 in creating their own video segments 126, Sally and Biff may include portions of other pre-existing digital media to create their own "mashup" video segments 126. For example, Sally combines haunting music, short portions of pre-existing video segments featuring ghosts, and her own character's reactions to strange events in the library to create her video segment.

The video segments 126 may include the tags 128 that enable a search of the video segments 126 based on the tags 128. The tags 128 may identify information about a video segment, such as a title, a storyline, a scenario, a geographic location, and/or an emotion. For example, Sally uses the first subscriber user interface 112 to create the digital tags 128 "Sally," "the librarian," "Springfield," "haunting in the library," "library," and "fear" to identify herself, her character, the storyline, the scenario, the location, and her emotion; and combines these digital tags 128 with her video segment.

The story line subscribers send in their video segments 126, possibly by uploading their video segments 126 to the website 116. For example, Sally uses the first subscriber user interface 112 to record and upload the video segment of Sally the librarian and Biff uses the second subscriber user interface 114 to upload the video segment of Biff the cab driver. In another example, Sally may record her video segment on a disc and mail the disc to the system administrators if Sally is experiencing temporary problems with her Internet connection.

The website 116 receives video segments 126 from story line subscribers. For example, the computer program 106 enables the website 116 to receive the video segments 126 based on haunting and the sky lights scenarios from the actors Sally and Biff via the subscriber user interfaces 112 and 114. The video segments 126 may be received stored on computer readable storage medium conveyed by couriers or uploaded via the personal home pages 138 for the story line subscribers. For example, the system administrators receive Sally's disc in the mail because Sally is experiencing temporary problems with her Internet connection.

A video segment may be edited for video segment length, audio production, color correction, addition of graphics, and/or addition of titles based on a request for post-production for a video segment. For example, the computer program 106 prompts a technician to edit Sally's video segment for color correction based on her request for color correction submitted with her video segment.

Viewers can use the user interfaces 108-114 to access the website 116 to view video segments 126 as part of a mass participation movie. These viewers may receive some of the recommendations 134 to view other video segments 126 based on popularity of video segments 126 and a viewer's viewing history, such as the viewer's choices and favorite actors. For example, if Bob uses the member user interface 110 to view Sally's video segment in which Biff the cab driver is mentioned, the website 116 may recommend for Bob to view Biff's video segment. In another example, if Bob enjoyed the realistic manner in which Sally the librarian expressed her fear, Bob may select from the recommendations 134 to view Sally's other video segments 126 and/or other video segments 126 that feature actors expressing fear. Bob may also select to view other video segments 126 that also depicted the haunting in the library and/or video segments 126 that also tagged their location as the library.

In order to attract the attention of potential viewers, a celebrity actor may briefly appear in a promotional video and provide the following voice-over while short portions of video segments 126 for some of the previous scenarios are featured: "The tenth-grade English class of the high school in Springfield has begun a new and exciting project. They want to put their quaint little town on the map by encouraging residents to create online video diaries. The student's goal is to show small town life through the eyes of its residents. The students are unaware that their little experiment will reveal far more than they ever imagined. As residents buzz about high school football games, block parties, and neighborly disputes, and simply live in a small town, surprising events begin to occur. Strange lights in the sky, ghostly aberrations, and a series of minor earthquakes become harbingers of greater mysteries brewing beneath the surface of complacent Springfield. There is nothing ordinary about life in this small town." The website 116 may enable a viewer to view one of the compilation videos 130 that depicts video segments 126 associated with a previous storyline if the viewer is a first-time viewer. A first-time viewer may watch one of the compilation videos 130 that features portions of the video segments 126 for previous scenarios to bring the first-time viewer up to date with the current scenarios.

Although this example illustrates a mass participation movie set in a small American town during a contemporary time period, the story lines for mass participation movies can feature other locations and times. For example, a story line may feature residents of the first human colony living on the planet Mars during the year 2050 and their efforts to adapt to life away from earth.

The video segments 126 depicted in the compilation may be selected based on segment viewing popularity, reviews of video segments 136, viewer voting, number of followers associated with a subscriber, and/or system administrator selections. For example, first-time viewers may view a combination of portions from the most frequently watched video segments 126 and the video segments 126 chosen by system administrators for story continuity during the celebrity voice-over. Viewers who are not first-time viewers may review information about their previous viewings. For example, when Bob accesses the website 116 via the member use interface 110, Bob may review which video segments 126 he watched the most frequently and which actors he has chosen to follow.

A viewer may be notified of receipt of a video segment from a story line subscriber based on an indication by the viewer to receive notification of the receipt, wherein the notification includes a link to view the video segment. For example, the computer program 106 notifies Bob via the member user interface 110 of the receipt of Sally's latest video segment based on Bob's prior registration as a follower of Sally. In this example, Bob may select a link in the notification to view Sally's latest video segment. The website 116 may recommend for a viewer to view a video segment related to a video segment previously viewed by the viewer. For example, the website 116 recommends for Bob, via the member user interface 110, to view Biff's video segment because Biff's video segment also discusses the strange lights in the sky that Sally discussed in the video segment previously viewed by Bob. The website 116 may enable viewers to create reviews of video segments 136. For example, the website 116 prompts Bob, via the member user interface 110, to write reviews for Sally's video segment and Biff's video segment. The recommendations 134 may be based on previous viewings by the viewer, the scenario for the video segment, the actor in the video segment, a viewing popularity of a video segment, a video segment review for the video segment, viewers' votes for the video segment, and/or the tags 128 for the video segment. For example, the website 116 recommends for Bob, via the member user interface 110, to view the video segment that received the highest average review rating from the video segments 126 for this week's scenarios.

The website 116 may enable viewers to create personal home pages 138. For example, the website 116 invites Tracy, via the viewer user interface 108, to become a member and create a personal home page similar to the personal home page of Bob, who is a member. Each of the personal homepages 138 may include information that identifies viewer participation in viewing video segments 126, viewer participation in related web blogs, viewer participation in related forums, acting biographies, contact information for viewers to contact story line subscribers, and contact information for actor employers to contact story line subscribers. Examples of personal home pages 138 are described below in reference to FIG. 3 and FIG. 4.

The website 116 may provide social media tools 140 that enable viewers to promote viewing the video segments 126 as part of a mass participation movie. For example, the website 116 provides the social media tools 140 that enable Bob, via the member user interface 108, to send communications to all of his friends listed in a social network site and invite them to view the video segments 126 of the Springfield mass participation movie. The video segments 126 featuring an actor may be compiled into a subscriber compilation in an exportable format and/or a web viewable format. For example, the computer program 106 responds to a request from Sally by compiling the video segments 126 selected by Sally into a compilation of Sally's selected video segments 126 that she can send to an agent who requested samples of her work after viewing some of Sally's video segments 126.

Figure 2:
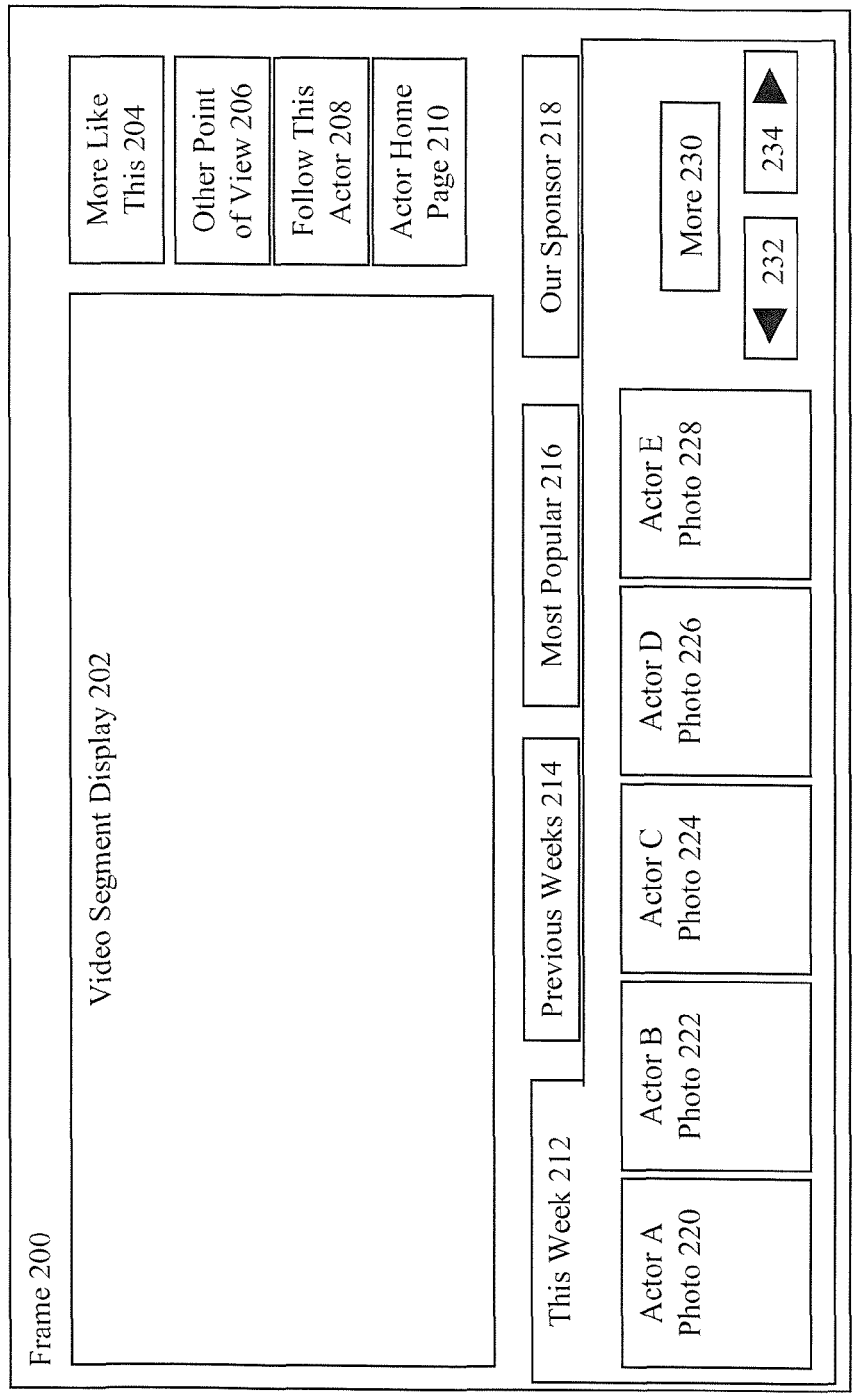
FIG. 2 presents a sample frame of a display screen presented by a user interface of the present disclosure.

FIG. 2 presents a sample frame 200 of a display screen presented by the viewer user interface 108 of the present disclosure. The frame 200 includes a "video segment display" section 202, a "more like this" option 204, an "other point of view" option 206, a "follow this actor" option 208, an "actor home page" option 210, a "this week" section 212, a "previous weeks" option 214, a "most popular" option 216, an "our sponsor" option 218, and both "actor photos" sections 220-228 and options 230-234 in the "this week" section 212.

After a viewer views video segments 126 via the "video segment display" section 202 to follow the continuing story line, the viewer may select from the options 204-210 to view video segments 126 that have similar tags 128, to view video segments 126 that depict the same scenario as the video segment that was just viewed, to include the actor in the video segment that was just viewed in a list of favorite actors, and to view the actor home page for the actor in the video segment that was just viewed, respectively. The "actor photos" sections 220-228 in the "this week" section 212 may depict the viewer's favorite actors who have submitted video segments 126 for this week's scenarios. When a viewer selects the "previous weeks" option 214, the website 116 may depict the different scenarios 120 for previous weeks. When a viewer selects one of the scenarios 120 for previous weeks, the website 116 may depict the viewer's favorite actors who have submitted video segments 126 for the selected week's scenarios 120. When a viewer selects the "most popular" option 216, the website 116 may depict the actors who have submitted the most frequently watched video segments 126 for this week's scenarios 120 and/or the previous weeks' scenarios 120. Similarly, the viewer may select the video segments 126 that received the most viewer votes and/or the highest average viewer review ratings. A viewer may select from the options 230-234 to navigate through the depicted photos of actors one at a time or in groups. The viewer may also select the "our sponsor" option 218 to view promotional information from a sponsor, such as an advertisement for an acting school or an upcoming broadcast of a reality television program.

A casual viewer may have limited access to the member home pages 138 and the actor home pages 138. A viewer who desires more participation in a mass participation movie can complete a simple registration form to become a member and create their own member home page, such as the member home page depicted in FIG. 3.

Figure 3:
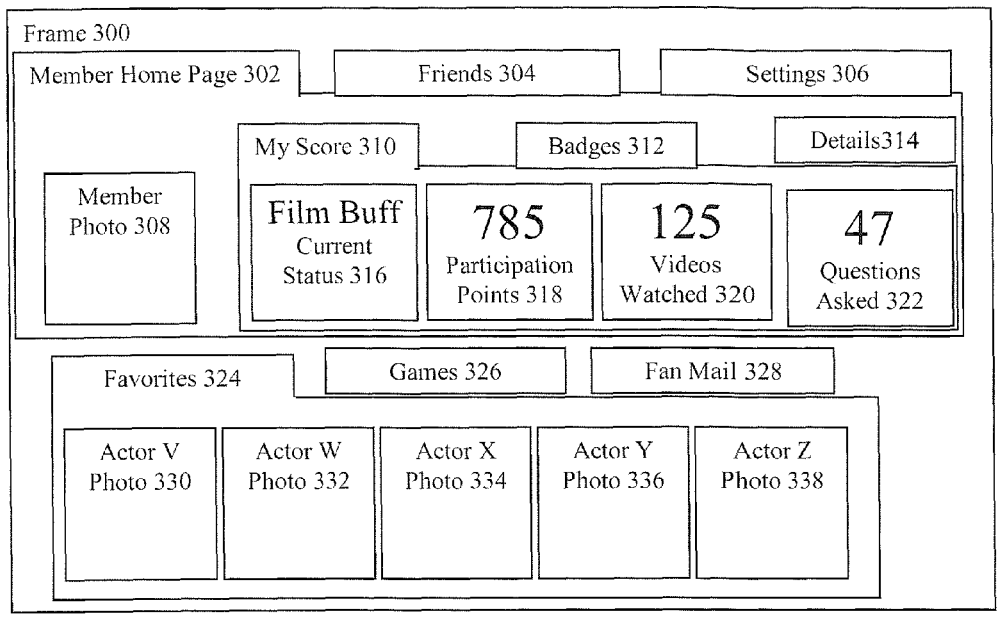
FIG. 3 presents another sample frame of another display screen presented by a user interface of the present disclosure.

FIG. 3 presents another sample frame 300 of a display screen presented by the member user interface 110 of the present disclosure. The frame 300 includes a "member home page" section 302, a "friends" option 304, and a "settings" option 306. The "member home page" section 302 includes a "member photo" 308 a "my score" section 310, a "badges" option 312, and a "details" option 314. The "my score" section 310 includes a "current status" section 316, a "participation points" section 318, a "videos watched" section 320, and a "questions asked" section 322. The frame 300 also includes a "favorites" section 324, a "games" option 326, and a "fan mail" option 328. The "favorites" section 324 includes "actor photos" 330-338.

A member can interact with actors by asking questions and posting comments to actors' blogs. Member home pages 138 enable members to participate by tracking a member's participation points. For example, the sections 316-322 in the "my score section" 310 indicate that the member Bob has asked 47 questions from actors and watched 125 video segments, which total to 785 participation points and earn the status of "Film Buff" for Bob. When a member selects the "friends" option 304, the frame 300 displays the other viewers who can share mass participation movies information with the member as friends. The "settings" option 306 enables members to invite other viewers to become friends, accept friend invitations, identify actors as favorites, upload the member photo 308, and/or manage other administrative functions.

When a member selects the "badges" option 312, the frame 300 displays the member's badges. Badges are icons that depict a level of progress. For example, a badge may depict an actor that a member has chosen to follow, such that the badge may change, such as from grey to gold or from small to large, as the member views more of the actor's video segments 126. When the actor uploads a new video segment, the member's badge for the actor may turn red or grow smaller, indicating that the member has a new video segment to view that features one of the member's favorite actors. When a member selects the "details" option 314, the frame 300 may display a list of the videos that the member has watched, how the participation points are calculated, and/or how many more points the member needs to reach the next status level. When a member selects the "games" option 326, the frame 300 may display mass participation movie games that the member can play. For example, a member can play a game and earn participation points by participating in a "scavenger hunt" which directs the member to conduct searches to view specific video segments 126, which may result in the member identifying a surprise video segment featuring a celebrity. When a member selects the fan mail option 328, the frame 300 may enable the member to submit questions to actors, review the questions that the member has submitted to actors, and/or review the answers the actors have submitted in response to the member's questions.

Members may have the capability to design and customize their personal home pages 138 as another way to express themselves. For example, the member photo section 308 may display a photo that the member uploaded, which may be a photo of the member, a photo of the member's favorite actor, or a photo of the member's favorite television or movie character. The "actor photo" sections 330-338 in the "favorites" section 324 may display some thumbnail photos of the member's favorite actors from the favorite actor's most recent video segments 126.

Some members may enjoy participating in the mass participation movie so much that the member may decide to become an actor by subscribing to pay a nominal fee, such as $10 a month. An actor participates in the guided experience of creating video segments 126 for the continuing story line, and may create an actor home page, such as the example depicted in FIG. 4. In addition to the benefits of increased exposure, creative release, and practice of the craft that an actor may receive through partaking in a mass participation movie, the actor may also gain an enhanced reputation through accumulation of a high total of popularity points and royalties from any compilations sold of the video segments 126 that feature the actor.

Figure 4:
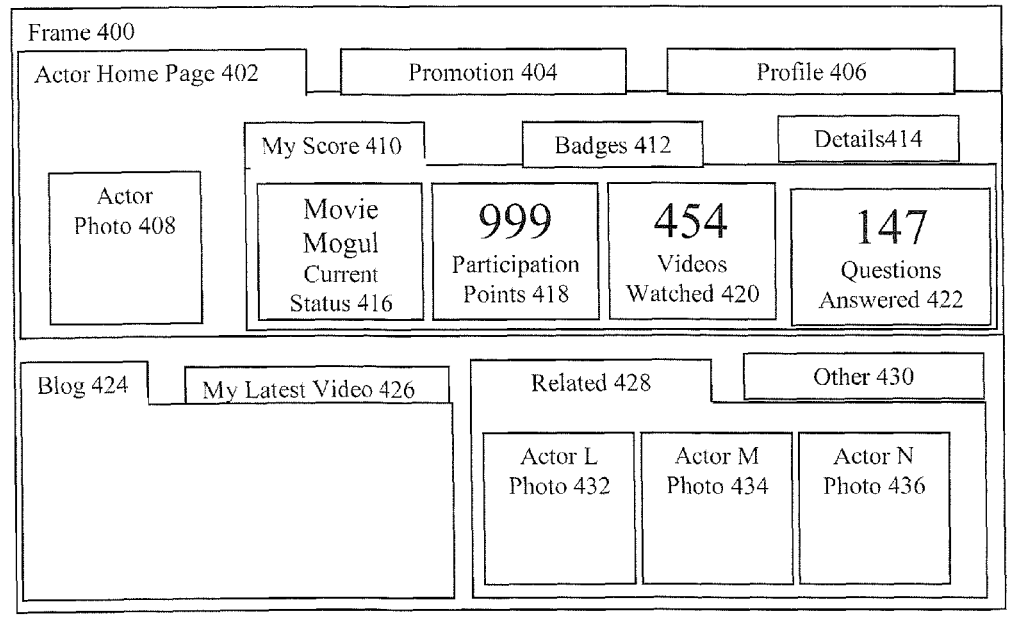
FIG. 4 presents yet another sample frame of yet another display screen presented by a user interface of the present disclosure.

FIG. 4 presents yet another sample frame 400 of a display screen presented by the first subscriber user interface 112 of the present disclosure. The frame 400 includes an "actor home page" section 302, a "promotion" option 404, and a "profile" option 406. The "actor home page" section 402 includes an "actor photo" 408 a "my score" section 410, a "badges" option 412, and a "details" option 414. The "my score" section 410 includes a "current status" section 416, a "participation points" section 418, a "videos watched" section 420, and a "questions answered" section 422. The frame 400 also includes a "blog" section 324, a "my latest video" option 426, a "related" section 428, and an "other" option 430. The "related" section 428 includes "actor photo" sections 432-436.

The sections and options 402-422 are similar to the sections and options 302-322 described above in reference to FIG. 3 with the following exceptions: The "questions answered" sections 422 indicates how many member questions that the actor has answered; and when the actor selects the "badges" options 412, the frame 400 displays information about the members who are followers of the actor.

Additionally, an actor may use their actor home page to upload video segments 126 that the actor created based on the storyline, write actor blogs, and interact with members by answering the members' questions. For example, an actor may post entries to the blog section 424 for the benefit of viewers. When a member viewing the actor's home page selects the "my latest video" option 426, the frame 400 presents the actor's most recently submitted video segment. Actors may also use the social media tools 140 available through their actor home pages 138 to promote their work to others who are viewers or members already and to those who are not yet viewers or members. For example, the actor may select the "other" option 430 to send email postcards to followers or to offer character-related merchandising to followers. The "related" section 428 may depict actors' photos for other actors who collaborate with the actor, and/or actors whose video segments have the same tags 128 as the actors' video segments 126. Actors may also receive the occasional story line through their actor home pages 138, such as receiving a weekly newsletter that details various scenarios. Furthermore, actors may access the "other" option 430 on their actor home pages 138 to use the actor training videos 122 or consult with other actors or acting professionals for acting advice through actor forums.

Because the frames 200, 300, and 400 are examples, the frames 200, 300, and 400 could vary greatly in appearance. For example, the relative sizes and positioning of the sections and options is not important to the practice of the present disclosure. The frames 200, 300, and 400 can be depicted by any visual display, but are preferably depicted by a computer screen. The frames 200, 300, and 400 can be part of a personal computer system and/or a network, and operated from data received locally, by the network, and/or on the Internet. The frames 200, 300, and 400 may be navigable by a user. Typically, the user can employ a mouse input device to point-and-click to a location on the frames 200, 300, and 400 to manage the data on the frames 200, 300, and 400, such as the selection of sections or options that enable a user to search for specific video segments 126. Alternately, the user can employ directional indicators, or other input devices such as a keyboard. The data depicted by the frames 200, 300, and 400 are examples, as the frames 200, 300, and 400 may have a much larger number of sections and/or options. Note that although the sections and/or options as shown are located in some parts of the frames 200, 300, and 400, in another embodiment the sections and/or options could be located in other parts of the frames 200, 300, and 400. The frames 200, 300, and 400 also include fields in which the user can input information, such as the tags 128 for video segments 126 to be uploaded or search terms to identify specific video segments 126. The frames 200, 300, and 400 may be part of a larger display screen that includes fields for users to enter search criteria, such as searches based on tags 128. The user interfaces 108-114 may output a display screen that includes the frames 200, 300, and 400 in response to a search based on search criteria input via the viewer user interfaces 108-114. For example, a viewer may enter the tags 128 "fear" and "library" to select from video segments 126 submitted by actors who expressed fear while in the location of the Springfield library.

When a member desires a greater degree of participation, but does not want to perform as an actor, the member may have other options. One option may be available for a smaller subscription fee, such as $2 a month, for a backstage pass status that enables the member to utilize all actor content (actor training videos 122, monthly newsletter, etc.) with the exception of the capability to upload video segments 126 or to create content through blogging, posting photos, and other forms of digital expression. Another option may be available for a slightly higher subscription fee, such as $6 a month, for a blogger status that enables the viewer to receive all of the backstage pass benefits plus the capability to create content through blogging, posting photos, and other forms of digital expression besides the uploading of video segments 126.

Figure 5:
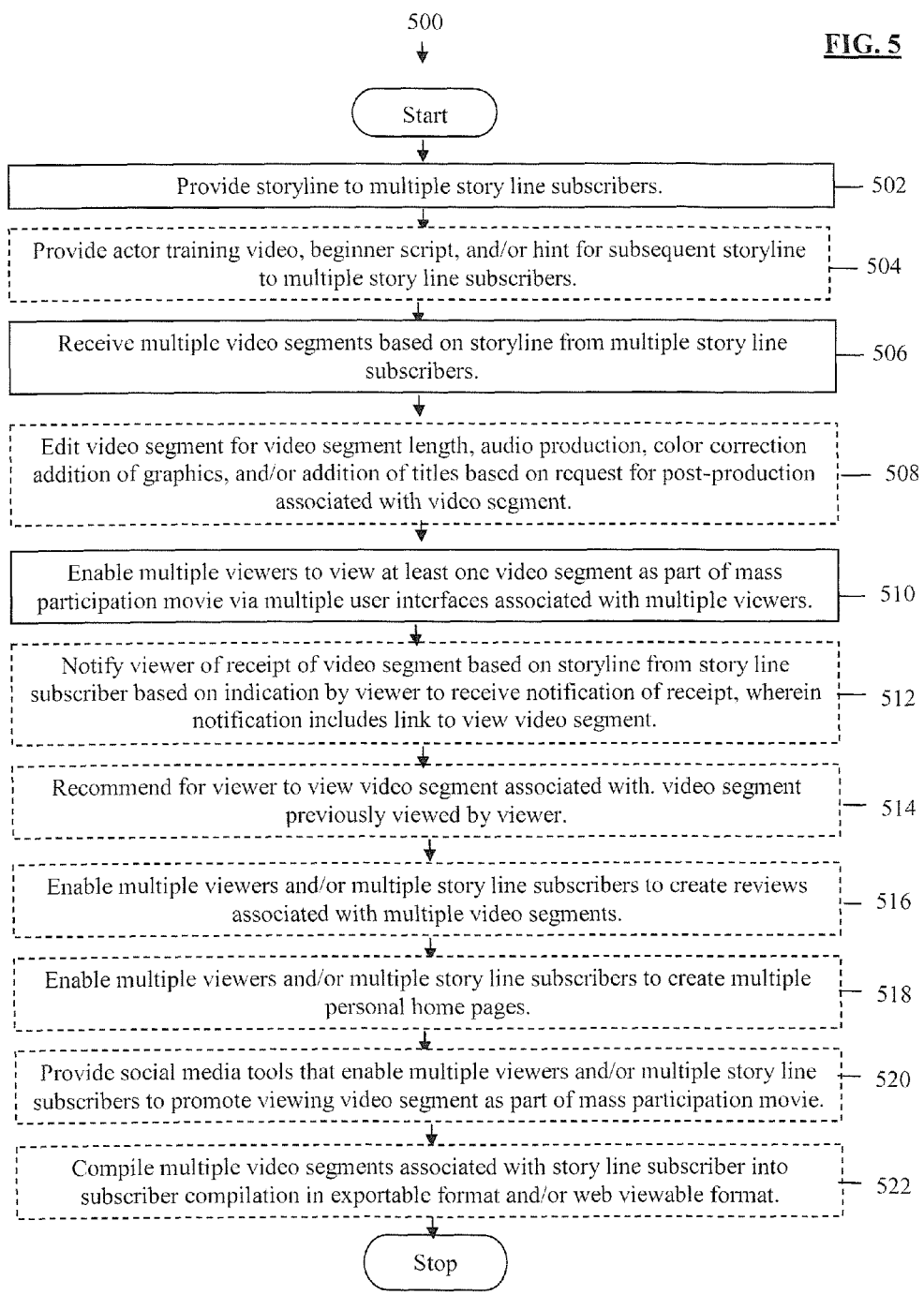
FIG. 5 presents a sample method of the present disclosure.

FIG. 5 presents a sample method 500 of the present disclosure. The system 100 may execute the method 500 to create mass participation movies and enable the viewing of mass participation movies.

In box 502, a storyline is provided to story line subscribers. For example, the website 116 provides the strange lights in the sky scenario to the actors Sally and Biff via the subscriber user interfaces 112 and 114.

In box 504, actor training videos, actor forums, beginner scripts, and/or hints for subsequent story lines are optionally provided to story line subscribers. For example, the website 116 provides a hint about the minor earthquakes for the next week's scenarios 120 to the actors Sally and Biff via the subscriber user interfaces 112 and 114.

In box 506, video segments are received from story line subscribers. For example, the website 116 receives the video segments 126 based on the haunting scenario and the strange lights in the sky scenario from the actors Sally and Biff via the subscriber user interfaces 112 and 114.

In box 508, a video segment is optionally edited for video segment length, audio production, color correction, addition of graphics, and/or addition of titles based on a request for post-production for a video segment. For example, the computer program 106 prompts a technician to edit Sally's video segment for color correction based on her request for color correction submitted with her video segment.

In box 510, viewers are enabled to view video segments as part of a mass participation movie via the viewer's user interfaces. For example, the website 116 enables viewers to view Sally's video segment and Biff's video segment as part of the Springfield mass participation movie via the user interfaces 108-114.

In box 512 a viewer is optionally notified of receipt of a video segment from a story line subscriber based on an indication by the viewer to receive notification of the receipt, wherein the notification includes a link to view the video segment. For example, the computer program 106 sends an email to the member user interface 110 to notify Bob of the receipt of Sally's latest video segment based on Bob's prior registration as a follower of Sally. In this example, Bob may select a link in the notification to view Sally's latest video segment.

In box 514, a viewer is optionally recommended to view a video segment related to a video segment previously viewed by the viewer. For example, the website 116 recommends, via the member user interface 110, for Bob to view Biff's video segment because Biff's video segment also discusses the strange lights in the sky that Sally discussed in the video segment previously viewed by Bob.

In box 516, viewers and/or story line subscribers are optionally enabled to create reviews for video segments 126. For example, the website 116 prompts Bob, via the member user interface 110, to write reviews for Sally's video segment and Biff's video segment.

In box 518, viewers and/or story line subscribers are optionally enabled to create personal home pages 138. For example, the website 116 invites Tracy, via the viewer user interface 108, to become a member and create a personal home page similar to Bob's personal home page.

In box 520, social media tools are optionally provided that enable viewers and/or story line subscribers to promote viewing video segment as part of a mass participation movie. For example, the website 116 provides the social media tools 140 that enable Tracy the new member to send communications to all of his friends listed in a social network site to invite them to view video segment of the Springfield mass participation movie.

In box 522, video segments associated with a story line subscriber are optionally compiled into a subscriber compilation in an exportable format and/or a web viewable format. For example, the computer program 106 responds to a request from Sally by compiling the video segments 126 selected by Sally into a compilation of Sally's selected video segments 126 that she can send to an agent who requested samples of her work after viewing some of Sally's video segments 126. The method 500 may be repeated as desired, such as on a daily, weekly, or monthly basis. A mass-participation movie may engage thousands of actors and viewers in an enjoyable experience that they would want to repeat and to share with their friends.

The systems, methods, and computer program products in the embodiments described above are exemplary. Therefore, many details are neither shown nor described. Even though numerous characteristics of the embodiments of the present disclosure have been set forth in the foregoing description, together with details of the structure and function of the present disclosure, the present disclosure is illustrative, such that changes may be made in the detail, especially in matters of shape, size and arrangement of the components within the principles of the present disclosure to the full extent indicated by the broad general meaning of the terms used in the attached claims. The description and drawings of the specific examples above do not point out what an infringement of this patent would be, but are to provide at least one explanation of how to make and use the present disclosure. The limits of the embodiments of the present disclosure and the bounds of the patent protection are measured by and defined in the following claims.

The invention claimed is:

1. A system for mass participation movies, the system comprising:
   a computer;
   a memory; and
   a computer program stored in the memory and executed by the computer to:
   provide a story line to a plurality of story line subscribers, the story line for creating a mass participation movie;
   receive a plurality of video segments created and uploaded by the plurality of story line subscribers, wherein said subscribers are actors, based on the story line to said computer; and
   enable a plurality of viewers to view a plurality of received video segments as part of a mass participation movie via a plurality of user interfaces associated with the plurality of viewers;
   wherein enabling the plurality of viewers to view a plurality of received video segments further comprises enabling a first viewer to view a compilation video created from a plurality of video segments received from a plurality of subscribers and associated with a previous story line and wherein the compilation video is based on at least one of segment viewing popularity, video segment reviews, viewer voting, number of followers associated with a subscriber, and system administrator selection in response to a determination that the first viewer is a first-time viewer.

2. A system as in claim 1, wherein the computer program is further executed by the computer to:
   provide a second storyline to the plurality of story line subscribers, the second story line for a creating a second mass participation movie;
   receive a second plurality of video segments, created by the plurality of story line subscribers and in which a plurality of the subscribers are actors; and
   enable the plurality of viewers to view a second plurality of video segments as part of the second mass participation movie via the plurality of user interfaces associated with the plurality of viewers.

3. A system as in claim 1, wherein the story line comprises a plurality of scenarios, and wherein a video segment based on the storyline comprises a video segment based on at least one of the plurality of scenarios.

4. A system as in claim 3, wherein the computer program is further executed by the computer to track a degree of participation associated with the plurality of scenarios.

5. A system as in claim 1, wherein the computer program is further executed by the computer to provide at least one of an actor training video, an actor forum, a beginner script, and a hint for a subsequent storyline to the plurality of story line subscribers.

6. A system as in claim 1, wherein the computer program is further executed by the computer to enable a search of the plurality of video segments based on at least one tag, wherein the at least one tag is associated with at least one of a subscriber identifier, a title, a storyline, a scenario, a geographic location, and an emotion.

7. A system as in claim 1, wherein receiving the plurality of video segments based on the story line from the plurality of story line subscribers comprises receiving a request for post-production associated with a video segment, and wherein the computer program is further executed by the computer to edit the video segment for at least one of video segment length, audio production, color correction, addition of a graphic, and addition of a title based on the request for post-production associated with the video segment.

8. A system as in claim 1, wherein the computer program is further executed by the computer to: determine whether a viewer is a return viewer, and enable a second viewer to view information associated with a previous viewing in response to a determination that the second viewer is a return viewer.

9. A system as in claim 1, wherein the computer program is further executed by the computer to notify one of the plurality of viewers of a receipt of a video segment based on the story line from one of the plurality of story line subscribers based on an indication by the one of the plurality of viewers to receive a notification of the receipt, wherein the notification comprises a link to view the video segment.

10. A system as in claim 1, wherein the computer program is further executed by the computer to recommend for a viewer to view at least one video segment associated with at least one of the plurality of video segments previously viewed by the viewer, wherein the recommendation is based on at least one of previous viewings by the viewer, a scenario associated with the video segment, a story line subscriber associated with the video segment, a viewing popularity associated with a video segment, a video segment review associated with the video segment, a viewer vote associated with the video segment, and an identifying tag associated with the video segment.

11. A system as in claim 1, wherein the computer program is further executed by the computer to enable at least one of the plurality of viewers and the plurality of story line subscribers to create reviews associated with the plurality of video segments.

12. A system as in claim 1, wherein the computer program is further executed by the computer to enable at least one of the plurality of viewers and the plurality of story line subscribers to create a plurality of personal home pages, wherein each of the personal homepages comprises information associated with at least one of viewer participation in viewing video segments, viewer participation in associated web blogs, viewer participation in associated forums, acting biographies, contact information for viewers to contact story line subscribers, and contact information for actor employers to contact story line subscribers.

13. A system as in claim 1, wherein the computer program is further executed by the computer to provide social media tools that enable at least one of the plurality of subscribers and the plurality of viewers to promote viewing at least one of the plurality of video segments as part of the mass participation movie.

14. A system as in claim 1, wherein the computer program is further executed by the computer to compile a plurality of video segments associated with a story line subscriber into a subscriber compilation in at least one of a web viewable format and an exportable format that comprises at least one of a video file and a digital video disc.

* * * * *